US009930505B2

(12) United States Patent
Cheng et al.

(10) Patent No.: US 9,930,505 B2
(45) Date of Patent: Mar. 27, 2018

(54) RETRIEVAL OF DIGITAL CONTENT RELATED TO UNAVAILABLE DIGITAL CONTENT

(71) Applicant: International Business Machines Corporation, Armonk, NY (US)

(72) Inventors: Tsz S. Cheng, Grand Prairie, TX (US); Tejashkumar B. Purani, Coppell, TX (US)

(73) Assignee: International Business Machines Corporation, Armonk, NY (US)

( * ) Notice: Subject to any disclaimer, the term of this patent is extended or adjusted under 35 U.S.C. 154(b) by 75 days.

(21) Appl. No.: 14/267,960

(22) Filed: May 2, 2014

(65) Prior Publication Data

US 2015/0319561 A1 Nov. 5, 2015

(51) Int. Cl.
  H04W 4/20 (2018.01)
  H04W 4/02 (2018.01)
  H04W 64/00 (2009.01)
  G06F 17/30 (2006.01)
  H04W 4/04 (2009.01)

(52) U.S. Cl.
  CPC ............ *H04W 4/206* (2013.01); *G06F 17/30* (2013.01); *G06F 17/3087* (2013.01); *G06F 17/30551* (2013.01); *H04W 4/02* (2013.01); *H04W 64/00* (2013.01); *H04W 4/04* (2013.01)

(58) Field of Classification Search
  CPC .... H04W 4/003; H04W 4/03; G06Q 20/3829; G06Q 30/02; G06Q 30/3829
  See application file for complete search history.

(56) References Cited

U.S. PATENT DOCUMENTS

| 7,979,434 | B2 | 7/2011 | Rothschild | |
|---|---|---|---|---|
| 8,687,949 | B2 | 4/2014 | Walters et al. | |
| 8,949,370 | B1* | 2/2015 | Wu | H04W 4/003 709/203 |
| 9,727,579 | B2 | 8/2017 | Broberg | |
| 2005/0190273 | A1 | 9/2005 | Toyama et al. | |
| 2011/0191253 | A1* | 8/2011 | Pilskalns | G06Q 20/3829 705/71 |

(Continued)

FOREIGN PATENT DOCUMENTS

WO 2012170739 A1 12/2012

OTHER PUBLICATIONS

IBM et al. "Method to separately record photo location metadata then request matching photos to reinforce memories in case initial photo is lost or just not good", An IP.com Prior Art Database Technical Disclosure, Original Publication Date: Jan. 4, 2010, IP.com No. IPCOM000191432D, IP.com Electronic Publication: Jan. 4, 2010, pp. 1-2.

*Primary Examiner* — Myron K Wyche
(74) *Attorney, Agent, or Firm* — Gilbert Harmon, Jr.

(57) ABSTRACT

In response to receipt of a request for digital content that includes a subject matter of an event, one or more processors request the locations of a plurality of mobile devices during a time period of the event. One or more processors determine whether the location a mobile device indicates that it was present at the event during the period of time of the event. In response to a determination the mobile device was present at the event; one or more processors send a request for the digital content to a user of that mobile device.

17 Claims, 3 Drawing Sheets

(56) References Cited

U.S. PATENT DOCUMENTS

| | | | | |
|---|---|---|---|---|
| 2012/0173333 A1* | 7/2012 | Berger | ............... | G06Q 30/0251 705/14.49 |
| 2013/0023291 A1* | 1/2013 | Pilskalns | ................ | G06Q 30/02 455/456.3 |
| 2013/0166904 A1* | 6/2013 | Amaya Calvo | ... | G06F 17/30056 713/151 |
| 2013/0304549 A1* | 11/2013 | Alhadeff | ................ | G06Q 30/02 705/14.1 |
| 2014/0150042 A1* | 5/2014 | Pacor | .............. | H04N 21/21805 725/116 |
| 2015/0026820 A1* | 1/2015 | Arana | .................... | G06F 21/10 726/27 |
| 2017/0171125 A1 | 6/2017 | Chow | | |

* cited by examiner

RETRIEVAL OF DIGITAL CONTENT RELATED TO UNAVAILABLE DIGITAL CONTENT

BACKGROUND OF THE INVENTION

The present invention relates generally to the field of multimedia content, and more particularly to retrieval of digital content.

Digital multimedia content is becoming increasingly available with the proliferation of devices that are capable of capturing digital multimedia content. These devices include, for example, cameras, video recorders, and smartphones. These devices often include internal memory, which is used to store the digital multimedia content that is captured by users of the device. However, the digital multimedia content can be lost if there is a malfunction with the device. For example, a smartphone that includes video footage of a high school football game is dropped onto pavement and the memory containing the video footage is damaged beyond repair. In this situation, the owner of the smartphone will no longer have access to that video footage since the memory that included the video footage is damaged.

The loss of certain types of digital multimedia content can affect the owner of that digital multimedia content. For example, the loss of a wedding video can adversely affect the wedding participants. In another example, the loss of graduation pictures can adversely affect members of a family. In yet another example, the loss of a video of the first words of a child or a school play can adversely affect the family of that child.

SUMMARY

Embodiments of the present invention provide a method, system, and program product to retrieve digital content. In response to receipt of a request for a digital content that includes a subject matter of an event, one or more processors request locations of a plurality of mobile devices during a period of time of the event. One or more processors determine whether a location of at least one mobile device included in the plurality of mobile devices indicates that at least one mobile device was present at the event during the period of time of the event. In response to a determination that, at least one mobile device was present at the event, one or more processors send a request to a user of that mobile device for the digital content.

DETAILED DESCRIPTION

While solutions to replace lost digital multimedia content are known, they are reliant on the existence of multiple copies of that digital multimedia content. For example, multiple copies of digital multimedia content may exist if a copy of that digital multimedia content was uploaded to an online storage and then shared and/or properly tagged such that the copy can be located if the original digital multimedia content is lost.

As such, some digital multimedia content is widely available online and easily searchable such as movie trailers, company logos, celebrity photos, photos from friends on social networks, etc. Conversely, many types of digital multimedia content are considered more private since; in general, the public does not have access to such content. Private digital multimedia content can be more difficult to replace, since that digital multimedia content may not be uploaded and/or shared online. Examples of private multimedia content can include, for example, family pictures and videos taken on digital cameras, cell phones, etc.

An embodiment of the present invention recognizes that replacing digital multimedia content with an exact copy of that digital multimedia content is not always possible. An embodiment of the present invention recognizes that with the proliferation of devices that are capable of capturing digital multimedia content, the possibility of digital multimedia content existing which includes the same subject matter is increased. An embodiment of the present invention recognizes that individuals that have digital multimedia content that includes the same subject matter are often capable of providing that content to another. An embodiment of the present invention recognizes that individuals that have digital multimedia content that includes the same subject matter can be incentivized to provide that content to another.

The present invention will now be described in detail with reference to the Figures.

Figure 1:
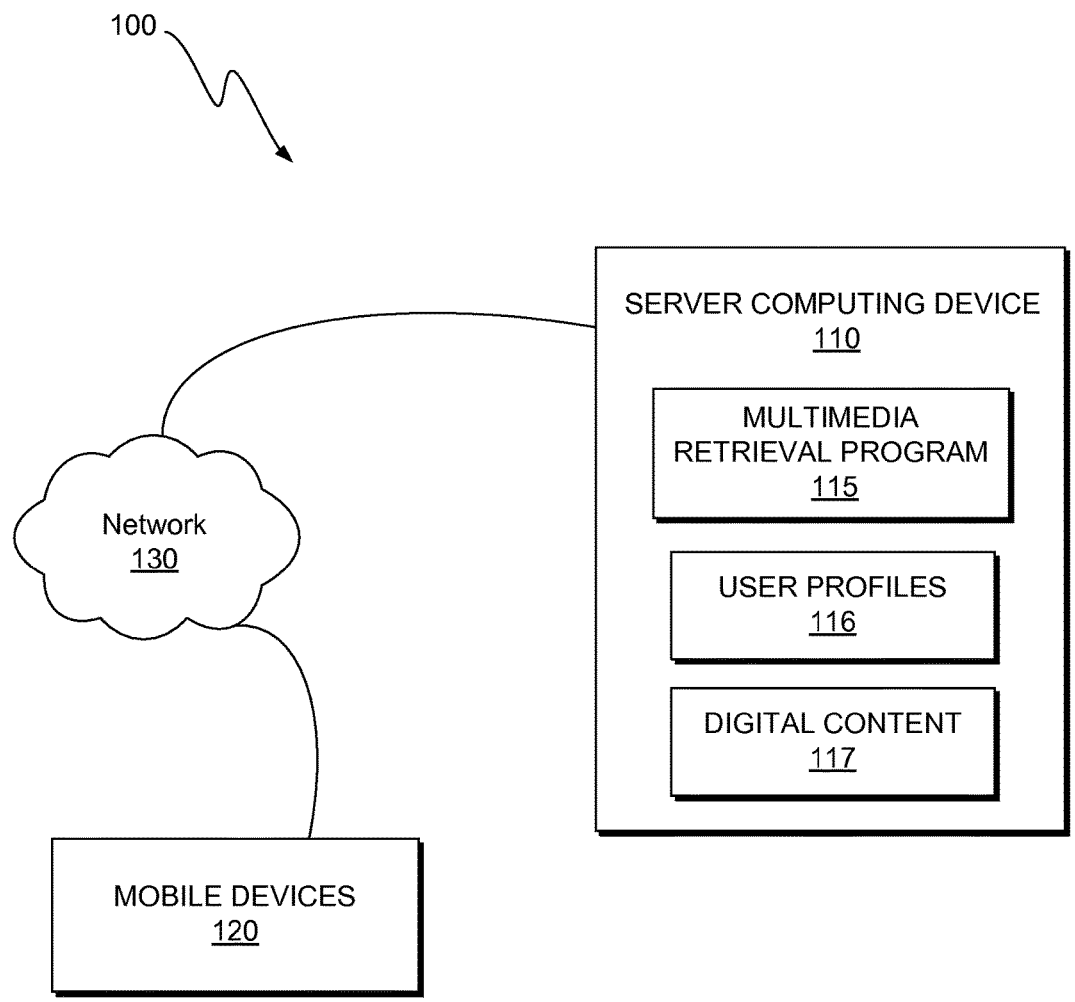
FIG. 1 is a functional block diagram illustrating a digital multimedia generating environment, in accordance with an embodiment of the present invention.

FIG. 1 is a functional block diagram illustrating digital multimedia generating environment, generally designated 100, in accordance with one embodiment of the present invention. Digital multimedia generating environment 100 includes server computing device 110 and mobile devices 120 connected over network 130. Server computing device 110 includes multimedia retrieval program 115, user profiles 116 and digital content 117.

In various embodiments of the present invention, server computing device 110 is a computing device that can be a standalone device, a server, a laptop computer, a tablet computer, a netbook computer, a personal computer (PC), or a desktop computer. In another embodiment, server computing device 110 represents a computing system utilizing clustered computers and components to act as a single pool of seamless resources. In general, server computing device 110 can be any computing device or a combination of devices with access to multimedia retrieval program 115, user profiles 116 and digital content 117 and is capable of executing multimedia retrieval program 115. Server computing device 110 may include internal and external hardware components, as depicted and described in further detail with respect to FIG. 3.

In various embodiments of the present invention, mobile devices 120 includes mobile devices that can respectively be smartphones, video cameras, audio recording devices, or digital cameras that are connected to network 130. In another embodiment, the mobile devices included in mobile devices 120 represents a computing system utilizing clustered computers and components to act as a single pool of seamless resources. For example, a video camera that is connected to a laptop computer that has a built in global positioning system (GPS) locator. In general, mobile devices 120 includes mobile devices that each can be any computing device or a combination of devices capable of determining the location of mobile devices 120 and is capable of communicating that location to multimedia retrieval program 115 via network 130. In certain embodiments, the mobile devices included in mobile devices 120 are each capable of capturing multimedia content, saving that multimedia content as digital data, and sending saved digital content to multimedia retrieval program 115 via network 130. The mobile devices included in mobile devices 120 may each include internal and external hardware components, as depicted and described in further detail with respect to FIG. 3, in accordance with various embodiments of the present invention.

In an embodiment, multimedia retrieval program 115, user profiles 116 and digital content 117 are stored on server computing device 110. However, in other embodiments, multimedia retrieval program 115, user profiles 116 and digital content 117 may be stored externally and accessed through a communication network, such as network 130. Network 130 can be, for example, a local area network (LAN), a wide area network (WAN) such as the Internet, or a combination of the two, and may include wired, wireless, fiber optic or any other connection known in the art. In general, network 130 can be any combination of connections and protocols that will support communications between server computing device 110, multimedia retrieval program 115, user profiles 116 and digital content 117 and mobile devices 120, in accordance with an embodiment of the present invention.

In an embodiment, multimedia retrieval program 115 facilitates the transfer of digital content, which often includes multimedia content, between users. In general, this digital content includes subject matter which was lost, i.e., is inaccessible by one user but is included in the digital content of another user. Multimedia retrieval program 115 uses parameters, such as time, date and location, which correspond to the lost digital content to conduct a query for alternative digital content which includes the same subject matter, often in multimedia content. If an alternative digital content is identified, then multimedia retrieval program 115 retrieves that content and provides it to the user who lost their digital content. For example, the parents of a child recorded a school play that included their child playing a leading role. However, upon returning home the parents discover that the file that included the video recording is corrupted. The parents enter the name of the school, and the time, date, and the title of the play into multimedia retrieval program 115 as search parameters. Multimedia retrieval program 115 sends out a query to identify mobile devices which were present at the school during the time and date of the play. In some embodiments, only the mobile devices of registered users that are registered with multimedia program 115 are queried. In other embodiments, a group of potential mobile devices are queried. In some embodiments, such a query is sent to a service provider, e.g., a cell phone service provider. In response to the query, the service provider then returns GPS location information for the mobile devices that were present to multimedia program 115. Multimedia retrieval program 115 then sends a request for digital content to the identified mobile devices which were present at the school during the time and date of the play. If a user of such a mobile device has a recording of the school play and they wish to offer that content to the user, then multimedia retrieval program 115 facilitates that transfer.

In embodiments, multimedia retrieval program 115 facilitates the transfer of digital content between users by providing incentives to users to share their digital content. In some cases, incentives include a monetary reward. In other cases incentives include a point based reward, such that providing digital content to another user earns points for the providing user, which can be used to, for example, download other digital content.

In some embodiments, the mobile devices queried by multimedia retrieval program 115 are registered with multimedia retrieval program 115 to indicate that they may be willing to provide their digital content to others. In this embodiment, user profiles associated with such mobile devices are included as part of user profiles 116. The user profiles indicate that the user associated with a respective mobile device may be willing to provide digital content. The profiles also include an identity of the mobile device as well as a preferred method of contact for the associated user. In certain embodiments, user profiles 116 also includes an account for the users that reflects accumulated and utilized incentives that were used to acquire or supply digital content. For example, the total points earned by supplying digital content and the amount of points spent to acquire digital content. In certain embodiments, points can be purchased by the registered users of multimedia retrieval program 115 and those points added to their account.

In an embodiment, digital content 117 is a repository for the digital content that was requested, and subsequently supplied, by users of multimedia retrieval program 115. In this embodiment, users do not upload multimedia content in anticipation of another user desiring that content. Such content is only uploaded and stored as part of digital content 117 after a request is received and processed by multimedia retrieval program 115.

Figure 2:
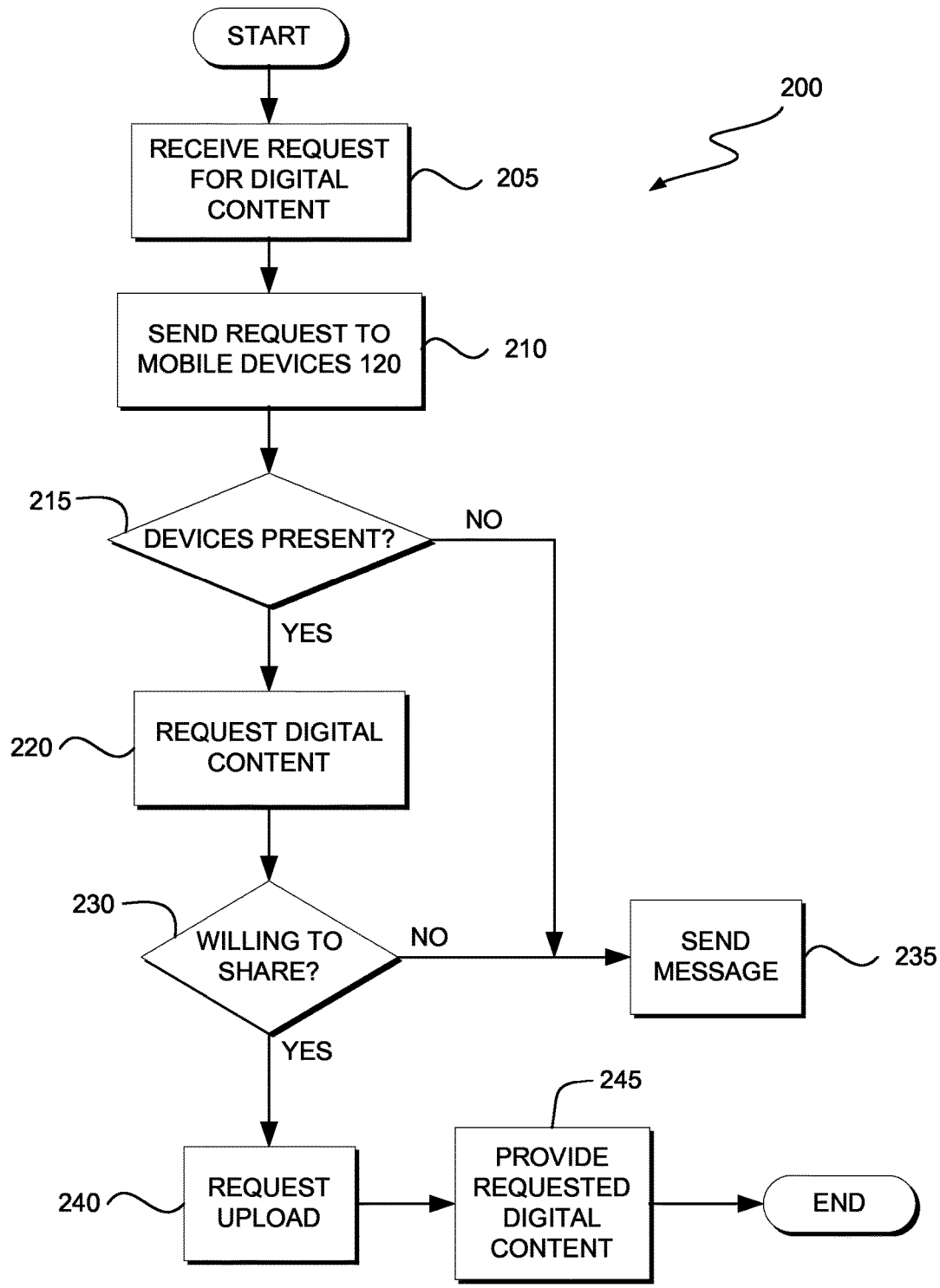
FIG. 2 illustrates a flowchart showing operational processes of a multimedia retrieval program, on a computing device within the environment of FIG. 1, in accordance with an embodiment of the present invention.

FIG. 2 illustrates a flowchart, 200, showing operational processes of multimedia retrieval program 115, executing on a computing device 110, within the environment of FIG. 1, in accordance with an embodiment of the present invention.

In process 205, multimedia retrieval program 115 receives a request for digital content for an event from a user (hereafter denoted as a "requesting user") and verifies the users account. The following example will be used to further explain the processes and functioning of multimedia retrieval program 115 in various sections of the discussion of flowchart 200. In the example, the request includes a media type of "video", a date of "Apr. 2, 2058", a location "Salmon Mousse Beach" and an event label of "Carp and Tuna wedding". The "video" indicates a type of digital content that is desired by the requesting user. In this embodiment, various data formats (e.g., .jpeg, .vid etc.) and types of digital content, e.g., audio and video, can be requested. In the following examples, the request includes a promise of compensation for a user who supplies a video that includes "Carp and Tuna wedding" content. As such, multimedia retrieval program 115 determines that the request for digital content includes an offer of compensation for the digital content. In addition, the user that sent the request for the digital content has an account included in user profiles 116 that indicates that the user has sufficient points to exchange for the search and to exchange for any digital content that is supplied.

In process 210, multimedia retrieval program 115 sends out a request to mobile devices 120, included in user profiles 116, to provide location information to indicate the location of the respective mobile devices 120 on Apr. 2, 2058. In some embodiments, a database is updated by the mobile devices included in mobile devices 120. The updates include information identifying digital content that was captured by the respective mobile device. Such information may include a time, a location and an event label for the captured digital content. As such, in these embodiments, multimedia program 115 searches that database to identify the location of mobile devices, which could have captured the event.

In determination process 215, multimedia retrieval program 115 determines whether any of mobile devices 120, included in user profiles 116, were present at the event, i.e. mobile devices 120 that were at the location of the event during a time that coincided with the event. In the example, multimedia retrieval program 115 determines whether any of mobile devices 120, included in user profiles 116, were present at Salmon Mousse Beach on Apr. 2, 2058, i.e., the event, based on received location information provided by respective mobile devices 120. If any of mobile devices 120 were present at the event (e.g., at Salmon Mousse Beach on Apr. 2, 2058), then multimedia retrieval program 115 sends a request for digital content to the respective users of those mobile devices 120, in process 220. The sent request includes the search parameters provided by the requesting user to allow identification of digital content that can serve as a replacement for the digital content that was lost by the requesting user. In the example, the request includes the offer of compensation for the digital content, i.e., a payment for video that includes the "Carp and Tuna wedding". If none of mobile devices 120 were present at the event (e.g., at Salmon Mousse Beach on Apr. 2, 2058), then multimedia retrieval program 115 sends a message to the requesting user indicating that no digital content was found, in process 235.

In determination process 230, multimedia retrieval program 115 determines whether any of the users, of mobile devices 120 that were present at Salmon Mousse Beach on Apr. 2, 2058, have indicated that they have digital content that they are willing to share with the requesting user. If none of the users have indicated that they have digital content that they are willing to share with the requesting user, then multimedia retrieval program 115 sends a message to the requesting user indicating that no digital content was found, in process 235. In some embodiments, the message indicates whether or not digital content exists and whether or not the owners of that content simply did not wish to share it. In those situations, a user may send a follow up offer with an increased amount of promised compensation for digital content to persuade the owner of that content to share it. If any of the users have indicated that they have digital content that they are willing to share with the requesting user, then multimedia retrieval program 115 sends a request for an upload of that digital content to the users of those mobile devices 120, in process 240. Any digital content that is received as a result of a request for digital content is saved, by multimedia retrieval program 115, as part of digital content 117. In this embodiment, digital content that is received as a result of a request for digital content is created by the user of the respective mobile computing device 120 and that digital content is only privately available. In other words the user of the mobile device 120 that was present at Salmon Mousse Beach on Apr. 2, 2058 recorded a video of the "Carp and Tuna wedding" and did not make that video publicly available, i.e., the digital content is publically inaccessible. For example, the user did not upload the video to a social media website.

In process 245, multimedia retrieval program 115 provides the received digital content to the requesting user and modifies the respective accounts of the requesting user and the user that provided the digital content to reflect the exchange of the digital content. In this embodiment, the exchange is reflected via a transfer of points from the account of the requesting user to that of the user that supplied the digital content. In some embodiments, the requesting user also pays a fee to a third party, e.g., the owner and operator of server computing device 110, for each digital content that is provided. In some embodiments, multimedia retrieval program 115 provides a preview of the digital content to the requesting user and does not initiate transfer of points or other form of compensation until the requesting user has indicated their approval of the content. For example, the returned results include two videos for the "Carp and Tuna wedding". However, one of the videos is of poor picture quality and was taken using a handheld camcorder. As a result, that video is difficult to watch. The other video was taken by a user with a tripod and a camcorder with an automatic focus. As such, the requesting user selects the higher quality video for download and the user who created that video is compensated accordingly.

Figure 3:
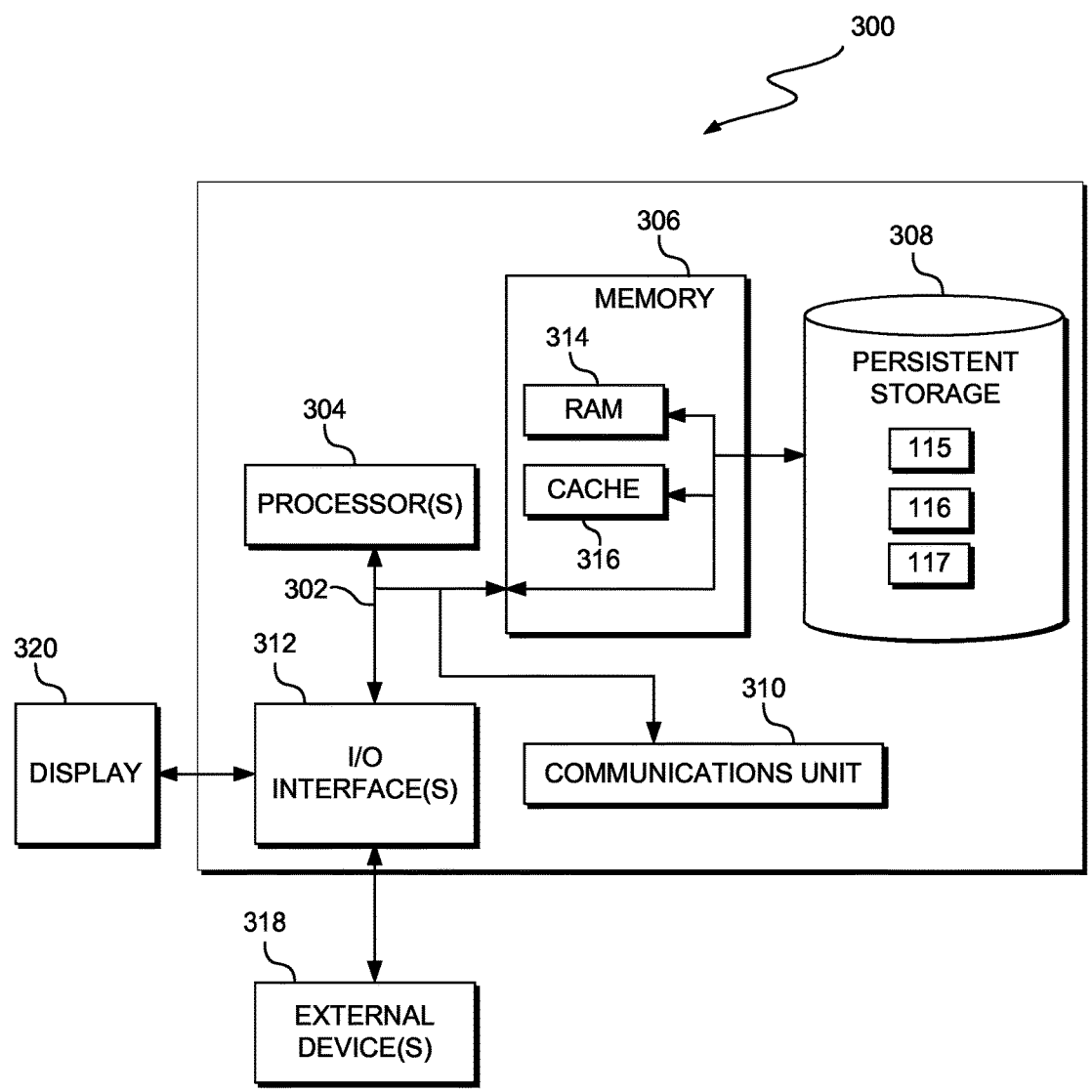
FIG. 3 depicts a block diagram of components of both mobile devices and the server computing device executing a multimedia retrieval program, in accordance with an embodiment of the present invention.

FIG. 3 depicts a block diagram, 300, of respective components of server computing device 110 and mobile devices 120, in accordance with an embodiment of the present invention. It should be appreciated that FIG. 3 provides only an illustration of one implementation and does not imply any limitations with regard to the environments in which different embodiments may be implemented. Many modifications to the depicted environment may be made.

Server computing device 110 and mobile devices 120 respectively include communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory X16. In general, memory 306 can include any suitable volatile or non-volatile computer-readable storage media.

Multimedia retrieval program 115, user profiles 116 and digital content 117 are stored in persistent storage 308 for execution and/or access by one or more of the respective computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including resources of network 130. In these examples, communications unit 310 includes one or more network interface cards. Communications unit 310 may provide communications through the use of either or both physical and wireless communications links. Multimedia retrieval program 115, user profiles 116 and digital content 117 may be downloaded to persistent storage 308 through communications unit 310.

I/O interface(s) 312 allows for input and output of data with other devices that may be respectively connected to server computing device 110 and mobile devices 120. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention, e.g., multimedia retrieval program 115 and digital content 117, can be stored on such portable computer-readable storage media and can be loaded onto persistent storage 308 via I/O interface(s) 312. I/O interface(s) 312 also connect to a display 320.

Display 320 provides a mechanism to display data to a user and may be, for example, a computer monitor, or a television screen.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

It is to be noted that the term(s) "Smalltalk" and the like may be subject to trademark rights in various jurisdictions throughout the world and are used here only in reference to the products or services properly denominated by the marks to the extent that such trademark rights may exist.

What is claimed is:

1. A method for retrieval of alternative private multimedia content, the method comprising:
    responsive to receipt of a request for alternative private multimedia content that includes a subject matter of an event, requesting, by one or more processors, locations of a plurality of mobile devices during a period of time of the event;
    determining, by the one or more processors, whether a location of at least one mobile device included in the plurality of mobile devices indicates that the at least one mobile device was present at the event during the period of time of the event;
    determining, by the one or more processors, whether the request for alternative private multimedia content includes an offer of a monetary or point-based incentive to share the alternative private multimedia content;
    responsive to a determination that the request for alternative private multimedia content includes the offer of the incentive, including the offer of the incentive as part of the request to a user of the at least one mobile device for the alternative private multimedia content;
    sending, by the one or more processors, a request to the user of the at least one mobile device for the alternative private multimedia content; and
    responsive to a determination that the user of the at least one mobile device denied the request for the alternative private multimedia content, updating, by the one or more processors, the request with an increased amount of incentive and sending, by the one or more processors, the updated request to the user of the at least one mobile device for the alternative private multimedia content.

2. The method of claim 1, wherein the request to the user of the at least one mobile device for the alternative private multimedia content includes a request for a type of multimedia content that includes the subject matter of the event.

3. The method of claim 1, further comprising:
    receiving, by the one or more processors, the alternative private multimedia content; and
    passing, by the one or more processors, the alternative private multimedia content to a user that submitted the request for the alternative private multimedia content.

4. The method of claim 1, wherein the alternative private multimedia content was created by the at least one mobile device and comprises private multimedia content of the at least one mobile device.

5. The method of claim 1, further comprising:
    receiving, by the one or more processors, compensation comprising a point-based incentive for providing alternative private multimedia content;
    storing, by the one or more processors, the compensation in association with a user account; and
    passing, by the one or more processors, at least part of the compensation from the user account to an account of the user of the at least one mobile device.

6. The method of claim 3, wherein the step of passing, by the one or more processors, the digital content to a user that submitted the request for the alternative private multimedia content comprises:
    providing, by the one or more processors, a preview of the alternative private multimedia content to the user that submitted the request for the alternative private multimedia content;
    determining, by the one or more processors, whether the user that submitted the request for the alternative private multimedia content has indicated that the alternative private multimedia content is acceptable; and
    responsive to the determination that the user that submitted the request for the alternative private multimedia content has indicated that the alternative private multimedia content is acceptable, passing, by the one or more processors, the alternative private multimedia content to the user that submitted the request for the alternative private multimedia content.

7. A computer program product for retrieval of alternative private multimedia content, the computer program product comprising:
    one or more computer readable storage media and program instructions stored on the one or more computer readable storage media, the program instructions to perform a method, the method comprising:
        responsive to receipt of a request for alternative private multimedia content that includes a subject matter of an event, requesting, by one or more processors, locations of a plurality of mobile devices during a period of time of the event;
        determining, by one or more processors, whether a location of at least one mobile device included in the plurality of mobile devices indicates that the at least one mobile device was present at the event during the period of time of the event;
        determining, by the one or more processors, whether the request for alternative private multimedia content includes an offer of a monetary or point-based incentive to share the alternative private multimedia content;
        responsive to a determination that the request for alternative private multimedia content includes the offer of the incentive, including the offer of the incentive as part of the request to a user of the at least one mobile device for the alternative private multimedia content;
        sending, by one or more processors, the request to a user of the at least one mobile device for the alternative private multimedia content; and responsive to a determination that the user of the at least one mobile device denied the request for the alternative private multimedia content, updating, by the one or more processors, the request with an increased amount of incentive and sending, by the one or more processors, the updated request to the user of the at least one mobile device for the alternative private multimedia content.

8. The computer program product of claim 7, wherein the request to the user of the at least one mobile device for the alternative private multimedia content includes a request for a type of multimedia content that includes the subject matter of the event.

9. The computer program product of claim 7, the method further comprising:
receiving, by one or more processors, the alternative private multimedia content; and
passing, by one or more processors, the alternative private multimedia content to a user that submitted the request for the alternative private multimedia content.

10. The computer program product of claim 7, wherein the alternative private multimedia content was created by the at least one mobile device and comprises private multimedia content of the at least one mobile device.

11. The computer program product of claim 7, the method further comprising:
receiving, by the one or more processors, compensation comprising a point-based incentive for providing alternative private multimedia content;
storing, by the one or more processors, the compensation in association with a user account; and
passing, by the one or more processors, at least part of the compensation from the user account to an account of the user of the at least one mobile device.

12. The computer program product of claim 9, wherein the step of passing, by one or more processors, the alternative private multimedia content to a user that submitted the request for the alternative private multimedia content comprises:
providing, by one or more processors, a preview of the alternative private multimedia content to the user that submitted the request for the alternative private multimedia content;
determining, by one or more processors, whether the user that submitted the request for the private multimedia content has indicated that the alternative private multimedia content is acceptable; and
responsive to the determination that the user that submitted the request for the alternative private multimedia content has indicated that the alternative private multimedia content is acceptable, passing, by one or more processors, the alternative private multimedia content to the user that submitted the request for the alternative private multimedia content.

13. A computer system for retrieval of alternative private multimedia content, the computer system comprising:
one or more computer readable storage media; and
a processor in communication with the one or more computer readable storage media, wherein the computer system is configured to perform a method, said method comprising:
responsive to receipt of a request for alternative private multimedia content that includes a subject matter of an event, requesting, by one or more processors, locations of a plurality of mobile devices during a period of time of the event;
determining, by one or more processors, whether a location of at least one mobile device included in the plurality of mobile devices indicates that the at least one mobile device was present at the event during the period of time of the event;
determining, by the one or more processors, whether the request for alternative private multimedia content includes an offer of a monetary or point-based incentive to share the alternative private multimedia content;
responsive to a determination that the request for alternative private multimedia content includes the offer of the incentive, including the offer of the incentive as part of the request to a user of the at least one mobile device for the alternative private multimedia content;
sending, by one or more processors, the request to a user of the at least one mobile device for the alternative private multimedia content; and
responsive to a determination that the user of the at least one mobile device denied the request for the alternative private multimedia content, updating, by the one or more processors, the request with an increased amount of incentive and sending, by the one or more processors, the updated request to the user of the at least one mobile device for the alternative private multimedia content.

14. The computer system of claim 13, wherein the request to the user of the at least one mobile device for the alternative private multimedia content includes a request for a type of multimedia content that includes the subject matter of the event.

15. The computer system of claim 13, the method further comprising:
receiving, by one or more processors, the alternative private multimedia content; and
passing, by one or more processors, the alternative private multimedia content to a user that submitted the request for the alternative private multimedia content.

16. The computer system of claim 13, the method further comprising:
receiving, by the one or more processors, compensation comprising a point-based incentive for providing alternative private multimedia content;
storing, by the one or more processors, the compensation in association with a user account; and
passing, by the one or more processors, at least part of the compensation from the user account to an account of the user of the at least one mobile device.

17. The computer system of claim 15, wherein the step of passing, by one or more processors, the alternative private multimedia content to a user that submitted the request for the alternative private multimedia content comprises:
providing, by one or more processors, a preview of the alternative private multimedia content to the user that submitted the request for the alternative private multimedia content;
determining, by one or more processors, whether the user that submitted the request for the digital content has indicated that the alternative private multimedia content is acceptable; and
responsive to the determination that the user that submitted the request for the alternative private multimedia content has indicated that the alternative private multimedia content is acceptable, passing, by one or more processors, the alternative private multimedia content to the user that submitted the request for the alternative private multimedia content.

\* \* \* \* \*